June 27, 1967 R. J. KOTIS 3,327,423
TROLLING MINNOW RIG
Filed July 6, 1964

INVENTOR.
Richard J. Kotis
BY William Cleland
Attorney

United States Patent Office 3,327,423
Patented June 27, 1967

3,327,423
TROLLING MINNOW RIG
Richard James Kotis, 1673 Overlook Road,
Kent, Ohio 44240
Filed July 6, 1964, Ser. No. 380,578
2 Claims. (Cl. 43—44.2)

This invention relates to artificial fish lures and in particular relates to a trolling minnow rig.

Heretofore, trolling minnow rigs have been provided wherein fishhooks were mounted in tandem relation on a fish line leader, as by tying knots in the leader. No satisfactory way was provided for quickly, manually adjusting the space between the hooks to accommodate minnows of varying sizes, or to provide requisite tensional connection between the minnow and the spaced hooks.

One object of the present invention is to provide a trolling minnow of the character described, including improved means for mounting a pair of hooks on a leader by which the spacing of the hooks is easily manually adjustable for quick, effective attachment of minnows of varying sizes.

Another object of the invention is to provide an adjustable minnow rig of the character described, in which the means for adjusting the hook spacing may be incorporated in the rig at a very low manufacturing cost, particularly because one hook is adjustably attached to the leader without knot-tying operations which would materially add to such cost.

These and other objects of the invention will be manifest from the following description and the accompanying drawings.

Figure 1:
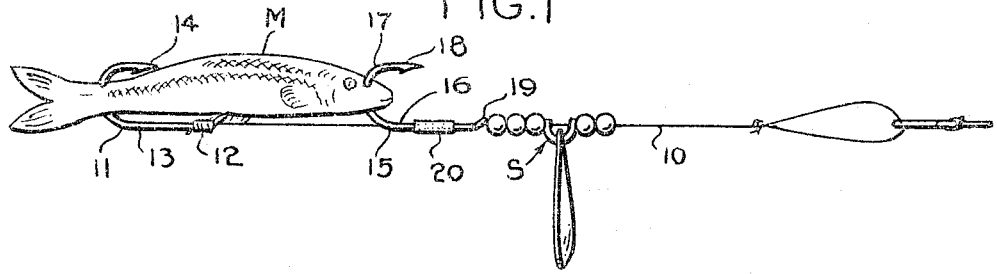
FIGURE 1 is a side elevation of an adjustable trolling minnow rig, embodying the features of the invention with a minnow attached to spaced hooks on the same.
Figure 2:
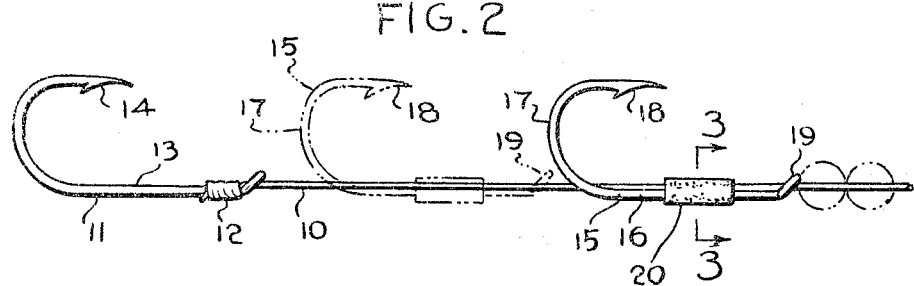
FIGURE 2 is an enlarged fragmentary view of the minnow rig shown in FIGURE 1, but without the minnow attached.

Referring particularly to FIGURES 1 and 2, the numeral 10 designates a fish line leader, namely a filament of cord, wire, or like material, but preferably of nylon, having a first fishhook 11 affixed to a trailing end, as by tying a knot 12 to the eyelet end of a shank 13 of the hook. Accordingly, a barbed end 14 of hook 11 is arranged to point forwardly of the leader.

Figure 3:
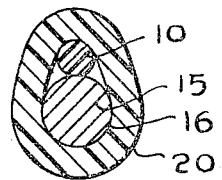
FIGURE 3 is a further enlarged cross-section taken substantially on the line 3—3 of FIGURE 2, illustrating the improved hook-adjusting means of the invention.

A second fishhook 15 may be longitudinally adjustably attached to the leader to have an elongated shank 16 co-extensive with the leader 10, and a reversely curved, substantially half-round trailing end 17 which terminates in a straight forwardly inturned end portion 18a formed with a barbed tip. Shank 16 terminates at a leading end in an angularly disposed eyelet 19, through which the leader is received to be in said co-extensive relationship to the shank. Shank portion 16 may be yieldingly gripped against longitudinal adjustment along the leader 10 by means of an elongated sleeve 20 of elastic material, such as extruded, tubular, prefused polyvinyl chloride, which is yieldingly expanded about the co-extensive portions of the leader and the shank 16 (see FIGURE 3), normally to embrace the same with a strong frictional grip which yieldingly resists longitudinal movement of fishhook 15 along the leader. The yielding grip of the sleeve 20, however, permits the fishhook 15 and the sleeve strongly embracing its shank 16 to be manually, yieldingly, slidable along the leader to vary the spacing between the first and second fishhooks 11 and 15. That is, the spacing of the fishhooks is variable as indicated in full and chain-dotted lines in FIGURE 2, for attaching minnows of various sizes between the barbed ends 14 and 18 of hooks 11 and 15, respectively.

For the foregoing purposes the sleeve 20 is thick-walled, and the internal diameter of the sleeve closely approximates the diameter or gauge of the straight shank 16 of hook 15. As an example, where the shank 16 is .031 inch diameter, and leader 10 is .015 inch diameter, the approximate dimensions of the sleeve 20 would be 5/16 inch long, .031 inch I.D., and .093 inch O.D. From this and other preceding description, it is self-evident that a thick-walled, prefused polyvinyl chloride sleeve 20, slidably but strongly embracing the shank 16 of the hook with a strong frictional grip, is not capable of being yieldingly stretched or expanded over the eyelet 19 of the hook 15, and accordingly sleeve 20 must be applied over the barbed tip 14 of the hook. Accordingly, for facilitating application of sleeve, as shown in FIGURE 4, in production of the improved trolling rigs, the length of the sleeve 20 may be greater than that of the barbed tip 18 but not substantially longer than the length of the generally straight inturned end portion 18a including the barbed tip portion 18, beyond the curved portion 17 of hook 15.

A known type of spinner assembly S may be applied to the leader, intermediate fishhook 15 and the usual looped end of the leader (see FIGURE 1).

Figure 4:
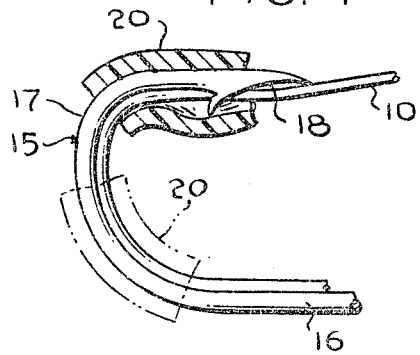
FIGURE 4 is a still further enlarged fragmentary cross-section of the hook end of the adjustable fishhook, partly broken away and in section, illustrating the method of assembling the adjustable hook on the leader.

FIGURE 4 illustrates the manner of applying the sleeve 20 to the fishhook 15, while the leader 10 is received through the sleeve. This is initially accomplished, as best shown in full lines, by squeezing, flattening, or otherwise distorting the sleeve 20, or portions thereof to work the barbed tip 18 of the hook 15 through the sleeve, as shown in full lines and without substantial hindering distortion of the end of the tube against the curved part 17 of the hook. Thereafter the sleeve is easily worked from the curved portion 17 of the hook (see chain-dotted lines in FIGURE 4), to a central portion of the straight shank 16, as best shown in full lines in FIGURES 1 and 2.

In use of the rig, best shown in FIGURE 2, the hook 15 is adjustable from or toward the hook 11 by gripping the sleeve 20 between thumb and forefinger, and manually forcing the sleeve and the hook along the leader 10 as indicated in chain-dotted lines. When the approximate required spacing of the hooks is acomplished, the barbed end 18 of the fishhook 15 is passed through the lips of a live minnow M, and then fishhook 15 is adjusted with reference to the fishhook 11 so that the barbed end 14 of hook 11 may be passed through the tail portion of the minnow. If necessary, the sliding hook 15 may be further adjusted so that the minnow will be securely positioned to ride with the rig assembly in the manner shown in FIGURE 1. Minnows may be mounted on the rig in a number of other ways, depending on the trolling action desired.

Modifications of the invention may be resorted to without departing from the spirit thereof or the scope of the appended claims.

What is claimed is:

1. A trolling minnow rig for a fish line, comprising: a leader, a first fishhook affixed to a trailing end of the leader to have a barbed end pointed forwardly of the leader; a second fishhook having a straight elongated shank terminating in a reversely curved opposite end which terminates in a substantially straight inturned end portion formed with a barbed tip, said shank terminating at a leading end in an eyelet through which the leader is received and extended to be co-extensive with the shank; and an elongated uniformly thick-walled sleeve of elastic material yieldingly expanded about the co-extensive portions of said leader and straight shank normally, frictionally to embrace the same in strong, yielding grip of the thick-walled sleeve and thereby prevent longitudinal movement of the second fishhook with respect to the leader, but permitting the second fishhook and the sleeve to be engaged between the fingers and manually yieldingly urged along the leader to vary the spacing between the first and second fishhooks, whereby the relative spacing of the fishhooks is yieldingly variable for attaching various sized minnows between the barbed ends thereof, the length of said sleeve being greater than that of said barbed tip, but not substantially longer than said straight inturned end portion, so that the sleeve can be forcibly received over the barbed tip onto and around the curved end portion without substantial bending of the sleeve which would prevent inward removal of the sleeve from said barbed tip.

2. A minnow rig as in claim 1, said leader being of nylon filament and said sleeve being of tubular, prefused polyvinyl chloride of inside diameter closely approximating the diameter of the shank portion of said second hook.

References Cited
UNITED STATES PATENTS

| | | | |
|---|---|---|---|
| 2,577,466 | 12/1951 | Jones | 43—44.83 X |
| 2,636,307 | 4/1953 | Mason et al. | 43—44.83 |
| 2,700,843 | 2/1955 | Werner | 43—44.83 X |
| 2,728,162 | 12/1955 | Jones | 43—44.85 |
| 2,854,781 | 10/1958 | Scozzari | 43—44.83 X |
| 2,911,753 | 11/1959 | Beckett | 43—44.83 X |

ABRAHAM G. STONE, *Primary Examiner.*

R. L. HOLLISTER, *Assistant Examiner.*

UNITED STATES PATENT OFFICE
CERTIFICATE OF CORRECTION

Patent No. 3,327,423                          June 27, 1967

Richard James Kotis

It is hereby certified that error appears in the above numbered patent requiring correction and that the said Letters Patent should read as corrected below.

In the heading to the printed specification, lines 3 and 4, for "Richard James Kotis, 1673 Overlook Road, Kent, Ohio 44240" read -- Richard James Kotis, Kent, Ohio, assignor to Fred Arbogast Co., Inc., Akron, Ohio, a corporation of Ohio --.

Signed and sealed this 25th day of June 1968.

(SEAL)
Attest:

Edward M. Fletcher, Jr.
Attesting Officer

EDWARD J. BRENNER
Commissioner of Patents